Figure 1:
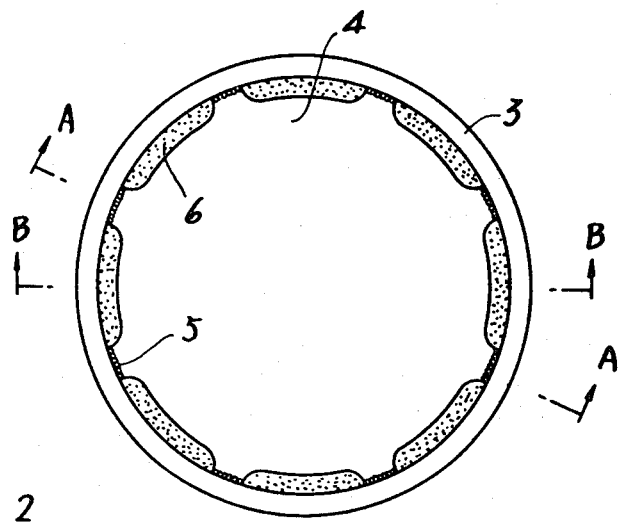

United States Patent [19]
Kurihara et al.

[11] 4,385,710
[45] May 31, 1983

[54] DEVICE FOR EMERGENTLY RELIEVING PRESSURE

[75] Inventors: Tomomichi Kurihara, Katano; Nobuyoshi Mori, Osaka, both of Japan

[73] Assignee: Hitachi Shipbuilding & Engineering Company Limited, Osaka, Japan

[21] Appl. No.: 279,470

[22] Filed: Jul. 1, 1981

[51] Int. Cl.³ .................. B65D 25/00; F16K 17/40
[52] U.S. Cl. ............................ 220/89 A; 137/68 R
[58] Field of Search ................ 220/89, 207; 137/67, 137/68 A, 68 R

[56] References Cited

U.S. PATENT DOCUMENTS 2,178,686 11/1939 Georgiev et al. .............. 220/89 A
3,313,113 4/1967 Maxson et al. ................ 220/89 A

FOREIGN PATENT DOCUMENTS 53147271 4/1980 Japan .

Primary Examiner—Allan N. Shoap
Assistant Examiner—Robert Petrik
Attorney, Agent, or Firm—Barnes, Kisselle, Raisch, Choate, Whittemore & Hulbert

[57] ABSTRACT

A device for emergently relieving pressure comprises a flexible plate bent downward and having its periphery attached to the inner surface of a hatch coaming, wherein the periphery of the plate is welded to the inner surface of the coaming at appropriate intervals, and the gap between the remaining part of the periphery of the plate and the coaming inner surface is sealed by a sealant.

When a specified pressure exerts on the flexible plate, the plate starts bending back upward. With the upward bending of the plate, the welds between the plate and the coaming are deformed and broken, allowing the plate to be blown off from the coaming. Thus the device, if installed on a fuel tank, serves to relieve the pressure in the tank for the maintenance of safety.

4 Claims, 3 Drawing Figures

U.S. Patent    May 31, 1983    4,385,710

DEVICE FOR EMERGENTLY RELIEVING PRESSURE

The present invention relates to a device for emergently relieving pressure in a fuel tank for safety purpose when the pressure in the tank grows abnormally high.

It is a usual practice to provide a pressure vessel or the like with a device for automatically releasing the internal gas from the vessel to prevent the vessel from breaking when the internal pressure becomes abnormally high. Conventional devices employed for this purpose, however, are designed to operate at a high pressure and has a relatively small opening area. Thus these devices are not applicable to fuel tanks, such as oil reserve tanks, which require a pressure relief device to operate at a relatively low pressure and to have a large opening area for coping with a drastic pressure variation as is caused by an explosion.

Japanese Utility Model application No. 53-147271 discloses a simple device which comprises a thin round plate curved downward and having its entire periphery welded to the inner surface of a cylindrical coaming. With this construction, the plate which has been initially bent downward bends upward when subjected to an abnormally high pressure, so that the weld between the plate and the coaming is deformed and finally broken. As a result, the plate is blown off from the coaming to release the pressure. However, since the bending stress is evenly distributed over the entire length of the weld, there is a possibility that even if the plate is subjected to a high pressure, the weld and the peripheral portion of the plate remains as initially mounted while only the central portion of the thin plate projects upward. Thus the intended pressure relief cannot be dependably achieved with this device.

An object of the present invention, in view of the above problem, is to provide a simple device for a fuel tank which has a relatively large opening area to cope with a drastic change in the internal pressure and which can reliably relieve the pressure in the tank when the internal pressure reaches a specified low value.

In order to fulfill this object, the present invention provides a device for emergently relieving pressure comprising a flexible plate bent downward and having its periphery welded to the inner surface of a hatch coaming at appropriate intervals, the gap between the remaining part of the plate periphery and the coaming inner surface being sealed with a sealant.

With this arrangement, since a large bending load produced when the plate is subjected to a high pressure tending to bend it upward acts concentratively on a reduced total length of the welds, the welds are easily broken and the plate is sure to be blown off from the coaming to relieve the pressure.

Figure 2:
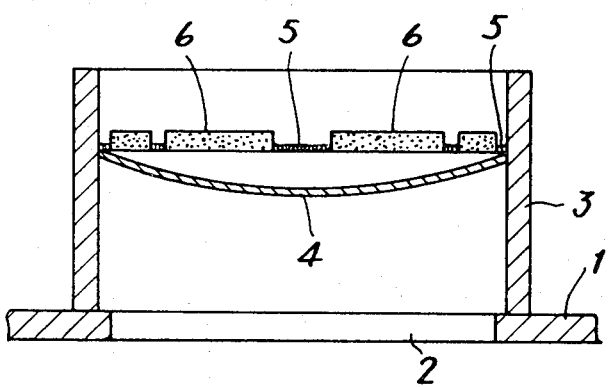
Figure 3:
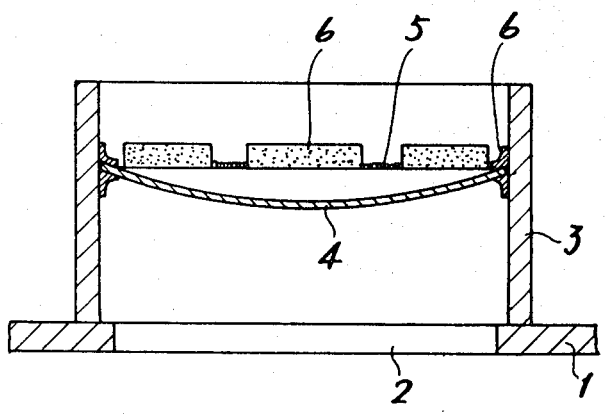

Various features and effects of the invention will become apparent from the description of an embodiment given with reference to the accompanying drawings, in which FIG. 1 is a top view of the pressure relief device according to the present invention, FIG. 2 is a view in section taken on the line A—A in FIG. 1 and showing the same, FIG. 3 is a view in section taken on the line B—B in FIG. 1 and showing the same.

Referring to the drawings, a fuel tank 1, such as an oil reserve tank, having a hatch opening 2 is provided with a cylindrical hatch coaming 3. A round flexible plate 4 is fitted in the coaming 3 as curved spherically downward.

As best illustrated in FIG. 1, the flexible plate 4 is welded at 5 to the inner surface of the coaming 3 at appropriate intervals. Between the welds 5 are provided sealants 6 to seal the gap between the remaining portion of the periphery of the plate 4 and the coaming inner surface.

The total length of the welds 5 is suitably 10 to 25% of the circumference of the flexible plate 4, and the strength of the welds 5, i.e., the strength of the connection between the flexible plate 4 and the coaming 3 should be such as to barely endure normal pressures (0.07–0.14 kg/cm$^2$) in the tank 1. The sealant 11 may be made of any material, such as silicone rubber, which is resistant against water, weather, ozone, and heat. The flexible plate 4 is made of a thin steel plate, preferably a thin stainless steel plate.

With the construction described above, the device operates in the following manner. When the pressure in the tank 1 rises to a specified level as by an explosion, the pressure causes the flexible plate 4 to bend back upward. Since the sealants 6 pose substantially no resistance to the upward bending of the plate 4, a large stress is concentratively produced in the welds 5. As a result, the welds 5 immediately break and the flexible plate 4 is blown off from the coaming 3 to release the pressure. Thus the device can reliably fulfil the intended function when the interval pressure rises to a specified level.

The present invention is not limited to the illustrated embodiment but can be modified in various ways within the scope of the appended claims.

What is claimed is:

1. A device for emergently relieving pressure comprising a flexible plate having a convex downwardly facing surface and a concave upwardly facing surface and having its periphery attached to the inner surface of a hatch coaming, wherein the periphery of the plate is welded to the inner surface of the coaming at appropriate intervals, and the gaps between the remaining part of the periphery of the plate and the coaming inner surface is sealed by a sealant.

2. A device as defined in claim 1 wherein the total length of the welded portion of the plate periphery is 10 to 25% of the circumference of the plate.

3. A device as defined in claim 1 wherein the sealant is synthetic resin.

4. A device as defined in claim 2 wherein the sealant is synthetic resin.

* * * * *